United States Patent
Dinning et al.

(10) Patent No.: US 11,343,271 B1
(45) Date of Patent: May 24, 2022

(54) SYSTEMS AND METHODS FOR ADAPTIVE SECURITY PROTOCOLS IN A MANAGED SYSTEM

(71) Applicant: United Services Automobile Association (USAA), San Antonio, TX (US)

(72) Inventors: Chad Dinning, San Antonio, TX (US); Steven Thoede, Boerne, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 54 days.

(21) Appl. No.: 16/790,579

(22) Filed: Feb. 13, 2020

Related U.S. Application Data

(63) Continuation of application No. 16/140,260, filed on Sep. 24, 2018, now Pat. No. 10,567,417, which is a
(Continued)

(51) Int. Cl.
*G06F 21/55* (2013.01)
*G06F 21/57* (2013.01)
(Continued)

(52) U.S. Cl.
CPC .......... *H04L 63/1433* (2013.01); *G06F 16/21* (2019.01); *G06F 16/23* (2019.01);
(Continued)

(58) Field of Classification Search
CPC . H04L 63/1433; H04L 63/1441; G06F 16/21; G06F 16/23; G06F 16/951;
(Continued)

(56) References Cited

U.S. PATENT DOCUMENTS

| 8,042,180 B2 | 10/2011 | Gassoway |
| 8,516,104 B1 | 8/2013 | Liu et al. |

(Continued)

FOREIGN PATENT DOCUMENTS

WO 2005064854 A1 7/2005

OTHER PUBLICATIONS

Analysis and Evaluation of Network-Based Intrusion Detection and Prevention System in an Enterprise Network Using Snort Freeware. Lawal. IEEE. (Year: 2013).*

(Continued)

*Primary Examiner* — Venkat Perungavoor
(74) *Attorney, Agent, or Firm* — BakerHostetler

(57) ABSTRACT

Embodiments disclosed herein describe one or more servers of an enterprise system that may be configured to receive security and vulnerability information from a plurality of data sources and then rate them based upon their respective variance from an enterprise policy or status quo configuration in a related process area. The servers may execute scoring modules to normalize the data received from the data sources to tailor the system response to a given vulnerability. As such, identified vulnerabilities may be rated according to the needs of the enterprise, rather than being rated according to the factory or default configurations of a particular data source.

18 Claims, 3 Drawing Sheets

Related U.S. Application Data continuation of application No. 15/261,518, filed on Sep. 9, 2016, now Pat. No. 10,084,811.

(60) Provisional application No. 62/216,164, filed on Sep. 9, 2015.

(51) Int. Cl.
| | |
|---|---|
| *H04L 29/06* | (2006.01) |
| *G06F 16/23* | (2019.01) |
| *G06F 16/21* | (2019.01) |
| *G06F 16/951* | (2019.01) |
| *G06F 21/12* | (2013.01) |

(52) U.S. Cl.
CPC .......... *G06F 16/951* (2019.01); *G06F 21/552* (2013.01); *H04L 63/1441* (2013.01)

(58) Field of Classification Search
CPC ........ G06F 21/552; G06F 21/577; G06F 8/65; G06F 3/123; G06F 3/1231; G06F 8/60; G05F 3/1225; G06Q 10/0635; G06Q 20/4016; H04N 21/26291; H04M 2203/052
See application file for complete search history.

(56) References Cited

U.S. PATENT DOCUMENTS

| | | | |
|---|---|---|---|
| 9,178,908 | B2 | 11/2015 | Call et al. |
| 10,084,811 | B1 | 9/2018 | Dinning et al. |
| 10,306,068 | B1 | 5/2019 | Chadha et al. |
| 10,860,722 | B2* | 12/2020 | Usuba .................. G06F 21/577 |
| 2004/0054764 | A1* | 3/2004 | Aderton ............. H04L 41/0859 709/223 |
| 2005/0021740 | A1 | 1/2005 | Bar et al. |
| 2006/0282887 | A1 | 12/2006 | Trumper et al. |
| 2008/0021801 | A1* | 1/2008 | Song .................. G06Q 10/0635 705/35 |
| 2009/0199296 | A1 | 8/2009 | Xie et al. |
| 2010/0114634 | A1 | 5/2010 | Christiansen et al. |
| 2010/0235918 | A1 | 9/2010 | Mizrahi et al. |
| 2010/0251370 | A1 | 9/2010 | Sun et al. |
| 2012/0304007 | A1 | 11/2012 | Hanks et al. |
| 2014/0130170 | A1 | 5/2014 | Kuo et al. |
| 2015/0178070 | A1* | 6/2015 | Doi ........................ H04W 4/50 717/172 |
| 2015/0242619 | A1* | 8/2015 | Bender ................... H04L 63/10 726/22 |
| 2016/0378993 | A1* | 12/2016 | McGee ............. G06F 16/24578 726/25 |
| 2018/0075563 | A1 | 3/2018 | Ananthanpillai et al. |

OTHER PUBLICATIONS

Planet Scale Software Updates. Gkantsidis. ACM. (Year: 2006).*
What Vulnerability Do We Need to Patch First?. Hong. IEEE. (Year: 2014).*
Securing SCADA Systems with Open Source Software. Mahboob. IEEE. (Year: 2013).*
Security Risk Vector for Quantitative Asset Assessment. Chung. Springer-Verlag. (Year: 2005).*
The Near Real Time Statistical Asset Priority Driven (NRTSAPD) Risk Assessment Methodology. Pak. ACM. (Year: 2008).*
Asset Priority Risk Assessment Using Hidden Markov Models. Pak. ACM. (Year: 2009).*
Effective risk mitigation: a user prospective. Shahzad. IJMCS. (Year: 2008).*
Risk Management Framework With COBIT 5 and Risk Management Framework for Cloud Computing Integration. Khrisna. ICAICTA. (Year: 2011).*
A Heuristic Approach for Qualitative Risk Assessment and Treatment Model. Sana. Dynamic Publishers. (Year: 2011).*
A Comprehensive Approach to Intrusion Detection Alert Correlation. Valuer et al., IEEE. (Year: 2004).
Network Risk Evaluation From Vulnerability Detection Tools. Hemanidhi et al., Mae Fah Luang University International Conference. (Year: 2012).
Discovering anomaly on the basis of flow estimation of alert feature distribution Liu et al. Security Comm Networks. (Year: 2013).

* cited by examiner

SYSTEMS AND METHODS FOR ADAPTIVE SECURITY PROTOCOLS IN A MANAGED SYSTEM

CROSS-REFERENCE TO RELATED APPLICATIONS

This application is a continuation of U.S. patent application Ser. No. 16/140,260, filed Sep. 24, 2018, which is a continuation of U.S. patent application Ser. No. 15/261,518, filed Sep. 9, 2016, which claims the benefit of U.S. Provisional Patent Application Ser. No. 62/216,164, filed Sep. 9, 2015, each of which is incorporated by reference herein in its entirety.

TECHNICAL FIELD

This application generally relates to network security, networking technologies, and managed enterprise networks.

BACKGROUND

Conventional security postures are premised around disparate and distinct network appliances, software, and devices, which often are unable to communicate with one another. To resolve such issues, security software companies have produced threat-intelligence software suites that are capable of importing data from various different devices. However, these tools amount to little more than a reporting tool that generates analytics reports using data converted from disparate formats of the originating devices. But these tools often lack remediation component that is automated and adaptive to a particular vulnerability. In addition, these analytics and reports are usually focused on the metrics associated with the originating device. For example, the analytics will indicate an enterprise's antivirus posture based on data received from the enterprise's antivirus management server. But the analytics could not indicate, for example, each of a variety of different vulnerabilities of several computing devices in the enterprise. What is needed is a means of generate datasets based upon a holistic view of an enterprise, but also allowing the data to be updated and dynamically adjusted in real-time.

With respect to remediation, security teams often employ a conventional helpdesk-ticket model. But this model is not adaptive to particular needs of an enterprise, and may be dependent upon out-of-the-box configurations of the disparate devices in the enterprise system. In particular, the helpdesk-ticket model of remediation has a static set of business rules that are unable to adaptively address complex issues, can slow the mitigation process and thus perpetuate ongoing vulnerabilities in an enterprise, and can be prohibitive or less-than-optimal data gathering for data analytics. Indeed, even conventional systems that allow for data collection and analytics, the analytics are performed separately, as a distinct programmatic behavior, where the primary output is merely a human-readable report of the analytics. But ultimately responses are manual, assignments are manual, and mitigations often require manual reconfiguration of the network. What is needed is a transformative and scalable capability providing enterprise administrators and automated remediation devices with quantified, normalized, real-time visibility into device status and remediation devices.

SUMMARY

Disclosed herein are systems and methods intended to address the shortcomings in the art, and may provide additional or alternative advantages as well. Embodiments disclosed herein may allow for most or all identified risk issues to be efficiently reviewed, and manually or automatically correlated with additional contextual metrics for manual or automated analysis, reporting, and/or downstream decision-making. One or more servers of an enterprise system may be configured to receive security and vulnerability information from a plurality of data sources and then rate them based upon their respective variance from an enterprise policy or status quo configuration in a related process area. The servers may execute scoring modules to normalize the data received from the data sources to tailor the system response to a given vulnerability. As such, identified vulnerabilities may be rated according to the needs of the enterprise, rather than being rated according to the factory or default configurations of a particular data source.

In an embodiment, a computer-implemented method comprises receiving, by a computer, via one or more networks a plurality of data records from a plurality of devices, each respective data record associated with a respective vulnerability, and each respective data record containing one or more data fields, the one or more data fields including a priority value; generating, by the computer, in a vulnerability database, a vulnerability record for each respective data record received from a source device in the plurality of devices, wherein each respective vulnerability record contains at least a portion of the one or more data fields of the data record, the one or more data fields including the priority value of the respective data record; generating, by the computer, in an issue database, an issue record based upon a set of one or more vulnerability records each having at least one corresponding data field, wherein the issue record contains at least a portion of the one or more data fields of the set of vulnerability records, and wherein the one or more data fields of the issue record include an updated priority value determined according to a predetermined normalization value and the priority value of each of the one or more vulnerability records in the subset of vulnerability records; and transmitting, by the computer, according to the priority value a plurality of issue records to one or more mitigation servers each comprising one or more software modules configured to update at least one configuration on one or more devices associated with the vulnerability identified in the one or more data fields of the respective issue record.

In another embodiment, a system comprises a vulnerability database hosted on one or more servers comprising non-transitory machine-readable storage medium, the vulnerability database configured to store one or more vulnerability records based on data records received from a plurality of devices configured to identify vulnerabilities, each respective vulnerability is associated with a respective data record identifying a respective vulnerability, each vulnerability record containing a priority score; and a hub server comprising a processor configured to receive via one or more networks each of the plurality of data records from each of the plurality of devices configured to identify the vulnerabilities; generate the respective vulnerability record for each respective data record; generate an issue record based upon a set of one or more vulnerability records having at least one corresponding data field, wherein the issue record contains at least a portion of one or more data fields of the set of vulnerability records; determine an updated priority value for the issue record associated with the respective vulnerability according to a predetermined normalization value and the priority value of each of the one or more vulnerability records in the subset of vulnerability records, wherein the one or more data fields of the issue record include the updated priority value determined; and transmit, according to the respective priority value, each issue record to one or more mitigation servers comprising one or more software modules configured to update at least one configuration on one or more devices associated with the vulnerability.

It should be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification, illustrate one or more embodiments, and together with the specification, explain the various aspects of the invention. The present disclosure can be better understood by referring to the following figures. The components in the figures are not necessarily to scale, emphasis instead being placed upon illustrating the principles of the disclosure.

DETAILED DESCRIPTION

Figure 1A:
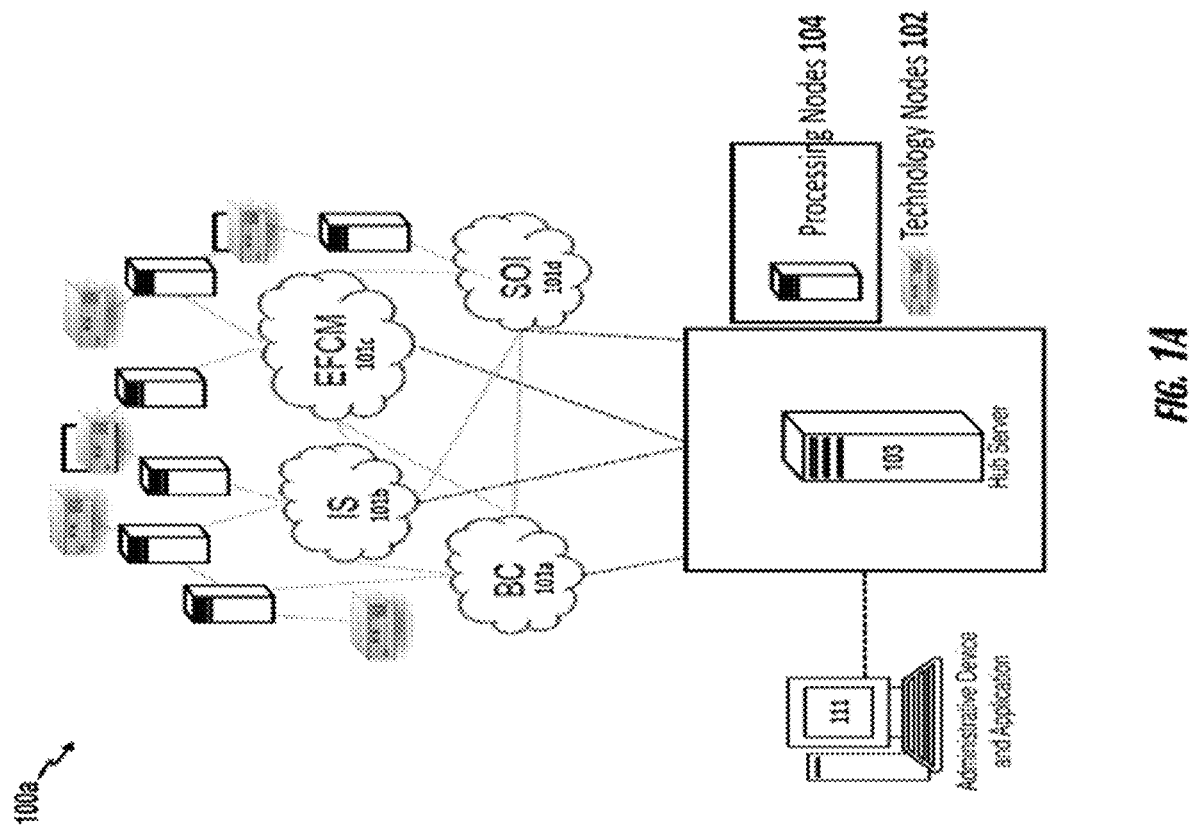
FIG. 1A and FIG. 1B each show components of an enterprise computing system, according to an exemplary embodiment.

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations, further modifications, and additional application of the inventive features and principles illustrated herein, which would occur to one skilled in the relevant art and having possession of this disclosure, are to be considered within the scope of the invention.

A suite of one or more manual and automated security tools may be integrated, managed, and monitored by a central hub server. For example, the Archer® suite of vulnerability and security products developed by RSA® may be included and controlled from a central hub server, along with zero or more third-party security tools that may be integrated into the scope of responsibilities of the central hub server. Central administrative security software modules may be executed by the central hub server to manage and monitor the various software tools integrated into the central hub server. Integration means that a central hub server, one or more software tools, and/or the central administrative security software modules, may be adapted to communicate data with the central hub server, so that the central administrative security software modules may receive data inputs from particular software tools and take appropriate action, as described further below. The hub server may be configured to receive files from an automated tool, such as, for example, a vulnerability scanner monitoring an enterprise network, a log repository that stores logged events related to actions or the status of a given server, or an output file of a penetration testing software application. In some embodiments, users may be able to manually input data inputs for manual processes. For example, an external consultant may input the output data results of the penetration testing software application, or a security guard may log an identified vulnerability related to a physical security component (e.g., bollard, fence, window, camera, door) falling short of the status quo.

In some implementations, administrators may define roles for particular users and aggregate data from various different data sources, and may even benchmark an organization's security posture and policies against competitors or itself. This may be accomplished by bringing in data from different sources and then comparing the data against security rules and configurations, as well as performance metrics. A vulnerability database or policy database may store the enterprise policy settings and status quo configurations for each process area, which may be referenced by software tools of data sources and/or by the central hub server.

Components of an Exemplary System

Figure 1B:
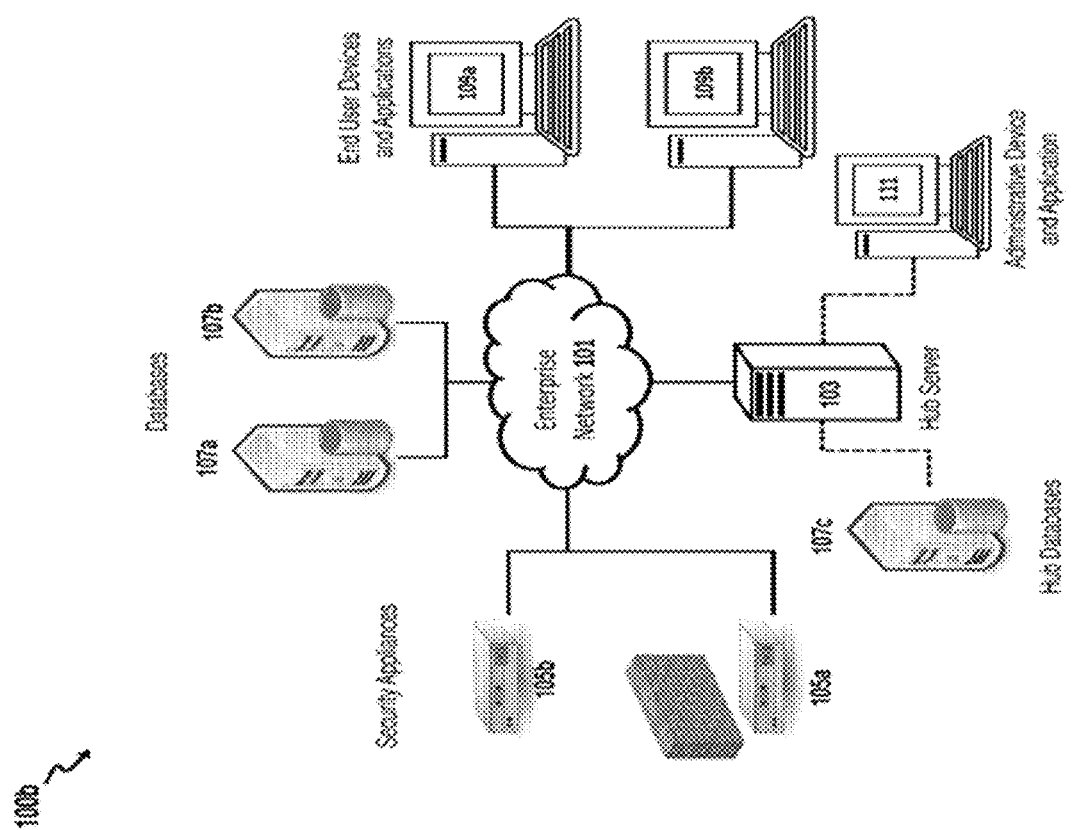

FIG. 1A and FIG. 1B each show components of an enterprise computing system, according to an exemplary embodiment. The enterprise computing system may comprise one or more networks 101 that interconnect nodes 102, 104 of various types, which may be a variety of computing devices and network appliances executing software configured to monitor and manage data transactions and device access to the enterprise computing system.

As shown in FIG. 1A, in some embodiments, an enterprise system 100a may comprise any number of sub-networks 101a-d, whereby the enterprise system 100a may be logically and/or physically segmented into smaller administrative collections of nodes 102, 104 bounded by certain network configurations (e.g., V-LANs, IP addresses, firewalls). In the exemplary enterprise system 100a, the networks 101a-d are segmented according to function, though one having skill in the art would appreciate a network 101 may be segmented according to any number of schemas. A network 101 may comprise any number of hardware and/or software components configured to facilitate networked-communication (e.g., routers, firewalls, switches) between computing devices (e.g., servers, workstations, laptops, tablets, smartphones) through various networking and application protocols (e.g., Ethernet, TCP/IP, 802.11, VLAN, ARP, ATM, IPSec, UDP HTTP, FTP, IMAP, DHCP, RDP, SSL). The exemplary enterprise system 100a shown in FIG. 1A may further comprise technology nodes 102, processing nodes 104, a hub server 103, and an administrative device 111. As mentioned, a node 102, 104 may be any computing hardware, computing device, or networking appliance accessing the enterprise system 100a.

Technology nodes 102 may be nodes configured to gather and/or store payload data associated with transactions between devices, as well as gather and/or store metadata describing communications between devices internal and/or external to the enterprise system 100a. As an example, a technology node 102 may be firewall configured to block IP packets from computing devices at a certain bloc of IP addresses and/or ports. The firewall may log in one or more databases 107 information associated with access attempts from external devices, such as source IP addresses, source MAC addresses, web browser information, and the firewall configurations that were applied to allow or deny the IP packets from an external device, among other information associated with the external device and/or access attempt. As another example, a technology node 102 may include databases 107 storing configuration data and analytics data indicating the network configurations and security effectiveness of comparable external enterprises, and/or indicating the network configurations and security effectiveness of each of the sub-networks 101a-d within the enterprise system 100a. For instance, a database 107 may contain a set of network configurations based upon the best practices published by National Institute of Standards and Technology (NIST), which may be accessible to an administrative device 111 and the hub server 103. In some cases, an administrator may access such configurations in a human-readable format (e.g., intranet webpage) to review the security posture of the enterprise system 100a. And in some cases, the configurations may be stored as a machine-executable code script or API, which may be executed by the hub server 103, a technology node 102, or a processing node 104 to identify poorly configured nodes 102, 104 on the system (e.g., an incorrectly configured router, an unpatched user computer), and/or may be executed by the hub server 103 to intelligently and dynamically update the configurations by pushing a configuration packet to the offending node 102, 104 or a notification to an administrative device 111.

Processing nodes 104 may be nodes configured to gather and/or store data received from technology nodes 102, and may execute various software modules that analyze or otherwise digest the data generated or stored by the technology nodes 102. A processing node 104 may forward to the hub server 103 some or all of the information received from technology nodes 102; additionally or alternatively, the processing node 104 may forward to the hub server 103 some or all of the information the processing node 104 generated from the data received from the technology node 102. As an example, a technology node 102 may be a promiscuous network appliance executing packet analyzer software, sometimes referred to as a "packet sniffer," configured to capture and log Ethernet traffic within a particular segment of a sub-network 101a. The packets may be stored into a database 107 accessible to a particular processing node 104, which may be a server computer executing traffic analytics software to monitor and evaluate the effectiveness of the network configurations and to identify any potential vulnerabilities in the network configurations. The traffic analysis data may be output to the hub server 103 in a human-readable format that the hub server 103 may forward as a report to an administrative device 111, or may be output to the hub server 103 in a machine-readable format, such as a script (e.g., Perl) or code (e.g., XML), which the hub server 103 may then execute or feed into an API for execution in a subsequent software module. The outputted script or the subsequent software module executed by the hub server 103 may include, for example, further analytics using additional input feeds from additional nodes 102, 104, and/or a report generation software module.

A hub server 103 may be one or more computing devices comprising non-transitory machine-readable storage media, a processor capable of executing the various tasks and processes described herein, and a network communications component (e.g., network interface card) capable of networked communication with various other devices on the enterprise system 100a. The hub server 103 may be coupled to one or more enterprise nodes 102, 104 via one or more networks 101a-d, and may receive data feeds from the nodes either directly or indirectly. For instance, a workstation executing vulnerability scanning software (e.g., AppScan®, Nessus®, QualysGuard®, Retina®, Sentinel®) is configured to scan enterprise system 100a nodes 102, 104 and assets to identify potential security vulnerabilities. Functioning as both a technology node 102 that gathers and generates data and a processing node 104 that generates analytics and reports based on the generated data, the workstation may output the data and/or analytics in a machine-readable format (e.g., XML) to the hub server 103 or an associated database 107 accessible to the hub server 103. Additionally or alternatively, the data may be outputted to computer file having a human-readable format (e.g., spreadsheet, word processing document). In these circumstances, the output file may be transmitted to the hub server 103, which may be configured to parse the file into data elements according to a predetermined data structure schema, and then generates a machine-readable file (e.g., XML) and/or database table using the parsed data elements. In some cases, the hub server 103 may also be configured to receive data feeds directly from one or more external nodes (not shown). For example, the hub server 103 may receive a listing of malware signatures or a listing of commonly recognized blacklist web domains published by a third-party server. Additionally or alternatively, a technology node 102 or processing node 104 of the enterprise system 100a may receive and use this type of information from a third-party service, and may then forward all or some of the information to the hub server 103.

In many cases, a technology node 102 or processing node 104 may be preconfigured to assign a particular weight or value to an identified vulnerability or weakness recognized in the system 100a, such as an unpatched workstation computer, where the value indicates the level of criticality of the particular identified issue. In such cases, the hub server 103 may be configured to normalize the scoring of each issue identified by the enterprise system 100a nodes 102, 104 according to various parameters. In this way, the administrator of the enterprise system 100a may normalize or possibly override the levels of criticality, allowing the hub server 103 to prioritize issues in a manner that is customized to the particular enterprise system 100a. Turning to a previous example in which a server executes a packet analyzer, the server may determine that a workstation is executing a Telnet application according to preconfigured signatures in the packet analyzing software. The packet analyzer may determine that the risk associated with this signature is, for example, a "nine" on a scale of "one-to-ten," or a "ninety" on a scale of "one-to-one-hundred." The packet analyzer then logs that information associated with the vulnerability (e.g., IP addresses associated with Telnet session, risk score) into a local or network database 107, or into a spreadsheet for later output. In this example, when the log or spreadsheet is consumed by the hub server 103, the hub server 103 may normalize these scores according to a preconfigured normalization scale.

Additionally or alternatively, the hub server 103 may also adjust the priority score according to preconfigured parameters that map a priority scaling coefficient to a type of identified issue (e.g., Telnet application executing over a particular network 101a), a type of source node 102 (e.g., packet analyzer), or other parameter, such that an identified issue is assigned an updated priority score, thereby re-prioritizing identified issues in way that is tailored to the enterprise system 100a. Although many embodiments automate the scoring adjustments, in some implementations, an administrative computer 111 may be used to update the score to a more tailored value, particularly when the hub server 103 is not configured to handle a certain issue. The hub server 103 may identify and assign tasks associated with issues for downstream mitigation, based on the type of issue and the criticality or prioritization score. As such, the adjusted priority scoring may affect downstream issue handling, such as changing the order in which an issue is addressed, the tasks to be performed, and/or the particular devices or parties involved with the issue mitigation.

In some embodiments, the hub server 103 may comprise and execute a reporting software module configured to generate human-readable reports from data received from nodes 102, 104 of the enterprise system 100a and/or data generated by the hub server 103 when executing various analytics. In some instances, the hub server 103 may generate a report in real-time when the hub server 103 identifies a triggering condition in the received or generated data. In some instances, the hub server 103 may generate a report at a predetermined interval by mining data records stored in one or more databases 107 of the system 100. The reporting module executed by the hub server 103 may be configured to query and parse predetermined data elements or data fields from the records of one or more databases 107 according to the configurations determined by an administrator, or dynamically determined by the hub server 103. A report may be a machine-readable computer file containing human-readable information that, when accessed by a corresponding software program configured to access and execute the particular file type of the report, may be displayed via a graphical user interface (GUI). Non-limiting examples of a report file format may include an XML file executed by browser, a word processing document executed by a word processor program, and a spreadsheet file executed by a spreadsheet program, among others.

FIG. 1B shows components of a sub-network 100b portion an enterprise system 100a, where the enterprise system 100a is segmented logically and/or physically into any number of smaller administrative sub-networks 100b. As shown in FIG. 1B, the exemplary system sub-network 100b may comprise a portion of the enterprise network 101, which may comprise device-networking hardware and software, and may include any number of security appliances 105, databases 107, and end user devices 109. The hub server 103 may be connected to the various devices of the sub-network 100b through the portion of the enterprise network 101. The hub server 103 may also be coupled to, or may otherwise host, a hub database 107c configured to store configuration data records and/or reporting data records; additionally or alternatively, the hub server 103 may be coupled to or may comprise an administrative device 111 configured to monitor and control the configurations of the hub server 103.

A security appliance 105 may be any computing device comprising a processor configured to execute various network and device security functions. Non-limiting examples of security appliances may include a firewall, an intrusion detection/prevention system, a packet analyzer, an encryption/VPN appliance, antivirus scanner, network scanners, and proxy server, among others. Security appliances 105 may be configured to generate log files as part of ordinary operation. The log files associated with a security appliance 105 may be generated and transmitted to the hub server 103 or to some intermediate processing software or server, such as a software-based vulnerability scanner or unified security management server. The logs may be generated and/or stored in on the appliance 105 and/or a database 107 in any number of formats, such as simple text or script files (e.g., .txt, .html, .perl, .xml, .vbs,), spreadsheets (.csv, .xsl), and structured database records (SQL, MS Access®, Oracle®). One or more APIs executed by the hub server 103 may query and identify individual records and elements in the logs, and may then parse the data fields of the records according to a data schema implemented by the hub server 103.

Databases 107 of the sub-network 100b may be hosted on any computing device comprising non-transitory machine-readable storage medium and a processor configured to execute database management system (DBMS) software or otherwise query the data stored in the storage medium. In some implementations, a database 107 may be a structured software suite with an integrated DBMS, such as MS SQL®, Oracle®, MySQL®, MongoDB®, and the like. In some implementations, a database 107 may be a network "mapped" hard drive managed by a local operating system (e.g., Linux®, Windows®) storing machine-readable computer files in various operating system directories.

In some cases, a database 107 may be hosted on an external device to the enterprise system 100a, or the records of the database 107 may be received from such an external device and stored on an enterprise database 107. In such cases, the databases 107 may receive and store external data sources, such as anti-virus signatures, firewall and intrusion detection signatures, and the like. A database 107 may also receive and store baseline data indicating a best practices configuration for a security posture, containing information from various standards organizations (e.g., NIST, SANS, IEEE), and information aggregated across similarly situation enterprise systems. This information may be received and stored in a human-readable format, such as spreadsheets or word-processing files. However, in some embodiments, this information may be received or converted to actionable formats by the hub server 103 or by the database 107 that will store the information. In these embodiments, APIs may parse and covert information received from the external data source into file formats containing data fields mapping to the data fields of the log files produced by various nodes 102, 104 of the enterprise system 100a, such as security appliances 105. The hub server 103 may automatically review the log files received from, for example, the security appliances 105 to identify whether the results of various processes or data-gathering tasks indicate that the enterprise system 100a or some sub-network 100b are compliant with the standards and/or vary from the baseline data. Databases 107 may also store prior log files, allowing the hub server 103 to identify trends, intelligently establish baseline patterns of the enterprise system 100, and/or dynamically trigger notifications or reports when there is variance from the internal or external baseline data stored in the databases 107.

Databases 107 may be established for each respective step or phase of vulnerability identification, assessment, and/or treatment, where each database stores records with data fields tailored for that particular step or phase, thereby allowing the hub server 103 to adaptively determine each next step when handling vulnerabilities, according to the specific set of circumstances for a particular vulnerability. For instance, in a conventional helpdesk ticket model, steps for handling a ticket are static, with little to no intelligence associated with identifying which technology unit should handle a ticket. But by generating records in discrete databases tailored for each of the segmented steps, the enterprise system may adaptively address a particular vulnerability.

For example, a vulnerability database may store vulnerability records received from various types of nodes 102, 104, such as security appliances 105 and software applications executed by end user computing devices 109. In this example, a vulnerability scanner may determine that the operating system of a particular end user device 109a has not installed the latest operating system patch; the data record received from the vulnerability scanner may be stored into a new vulnerability record of the vulnerability database. In addition, an antivirus management server responsible for "pushing" new antivirus signatures to devices of the system 100 may determine that the end user device 109a has out-of-date antivirus signatures. The antivirus server may generate and transmit to the hub server 103 a data record indicating this vulnerability, which may be stored into a new vulnerability record in the vulnerability database. The hub server 103 may reference a configurations database, also referred to herein as a hub database 107c, that stores configuration records for nodes 102, 104 of various types in the enterprise system 100a. In operation, the hub server 103 may reference the configuration records of a particular type of device to determine the level of variance from the configuration record and the data fields within a particular vulnerability record. If the amount of variance exceeds a predetermined threshold value, based on the number of vulnerabilities associated with a particular device, and/or based on an aggregate amount of one or more priority score exceeding a criticality threshold, the hub server 103 may then generate an issue record for a device on the network that is associated with the vulnerability.

End user devices 109 may be any computing device comprising a non-transitory machine-readable storage medium and a processor configured to execute one or more software modules that generate information to be consumed by the hub server 103. The end user device 109 may be any computing device resident on the enterprise system 100a that may produce data packets over the network 101. In some cases, the end user device 109 may be a typical workstation for an employee whose work is unrelated to the security or administrative efforts of the enterprise, yet network and/or security appliances 105 may capture and log the various data packets transmitted and received, to and from the particular end user device 109. In some cases, the end user device 109 may execute various software modules associated with network or security administration, and thus generates data to be consumed directly by the hub server 103. For example, an end user device 109a may execute penetration testing or vulnerability assessment software that, as a person having ordinary skill in the art would appreciate, identifies and logs security vulnerabilities across a broad range of hacking attack vectors, such as unnecessarily open firewall ports, low-threshold password complexities, unusual or greylisted/blacklisted applications running on an enterprise device 109b, out-of-date antivirus signature definitions, among others. In this example, the software executed by the end user device 109a may identify the vulnerabilities in the enterprise system 100a, and may generate a report in any number of machine-readable computer file formats, such as a spreadsheet, word processing file, text file, scripting or software module, or some proprietary file format. The hub server 103 may execute APIs that parse and the data fields of the report into mapped data fields recognized by the hub server 103, effectively converting the file format from the format generated by the application executed by the end user device 109 into the file format compatible with the hub server 103. In some cases, this "import" of data generated by the end user device 109 into the hub server 103 may be automated or preconfigured through various APIs, whereby the end user device 109 is configured to store the data output into one or more locations of a database 107 and a listener module executed by the database 107 or hub server 103 automatically parses, converts, and imports the data into the hub server 103 for downstream processing. In some cases, a user may instruct the hub server 103 to execute an importing routine to execute the various APIs to parse and convert the outputted data generated by the end user device 109 into an appropriate format recognizable to the hub server 103.

An administrative device 111 may be any computing device comprising a non-transitory machine-readable storage medium and a processor configured to execute various software modules allowing an administrative user to access and manipulate various configurations and settings in the hub server 103 or other devices around the system 100. In many cases, the enterprise system 100a may comprise a computer (e.g., server, laptop, workstation, tablet) that executes a directory service software program (e.g., Microsoft Active Directory®, Red Hat Directory Server®, Oracle Internet Directory®, IBM Tivoli Directory Server®) and associated protocols (e.g., X.500, LDAP, DSML, SPML) that manages and updates access rights for users and devices across and enterprise system 100a. An administrative user with appropriate rights may access the hub server 103 and update or override certain predetermined configurations used by the hub server 103 during execution. For instance, the administrative user may update configuration records to inform the hub server 103 regarding a threshold variance value for particular types of vulnerabilities, or for any vulnerabilities associated with a particular device. In some instances, the administrative device 111 is the same physical device as the hub server 103, and in some instances, the administrative device 111 is a distinct physical device.

Execution of an Exemplary Process

Figure 2:
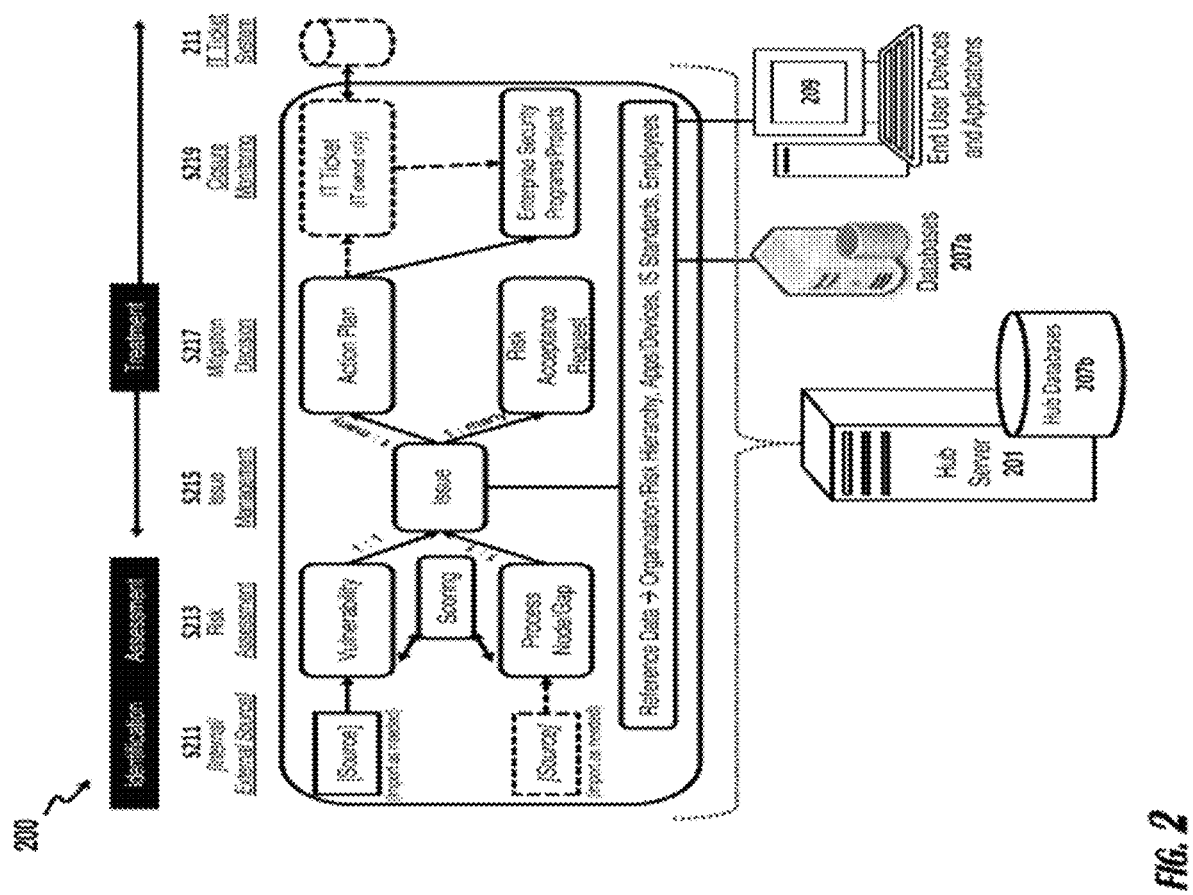
FIG. 2 shows execution of a security process executed by hardware and software modules associated with an enterprise system described herein, according to an exemplary embodiment.

FIG. 2 shows execution of a security process 200 executed by software modules associated with an enterprise system described herein. The steps of execution by the software modules may be executed on one or more servers, described herein as a central hub server 201. The security process 200 may receive, assess, and in some cases mitigate, shortcomings in physical or data security policy and expected status quo. The exemplary process 200 may be generally broken into three phases: identification of shortcomings, assessments of shortcomings, treatment of shortcomings; generally comprising the steps S211, S213, S215, S217, and S19, which may be broken into sub-components as described further below. It should be appreciated by a person having ordinary skill in the art that these steps are merely exemplary, and as such, a person having ordinary skill in the art would recognized that additional or alternative steps, or fewer steps, may be executed in other embodiments.

In a first step S211, during an identification phase, internal and external data sources may be imported or otherwise received by the hub server 201 from one or more data sources. Data sources may include any number of internal and external automated software tools executed by internal or external computing devices 209, as well as manual inputs by users, such as security guards, through a GUI, where the computing devices and other data sources may be configured to transmit the data inputs to one or more databases 207.

Based upon the data received from the various data sources reporting data about the enterprise to the central hub server 201, shortcoming-identification software modules of the central hub server 201 may automatically identify any type of variance from a pre-configured enterprise status quo, according to formatted data files stored in, for example, a hub database 207b. That is, the central hub server 201 may identify wherever there is a variance from an enterprise's standard or status quo.

In a next step S213, during a risk assessment step of an assessment phase, the central hub server 201 may update a vulnerability record in a database 207 for an identified vulnerability, and may generate additional data as well to be included into the record of the vulnerability. For example, the central hub server 201 may categorize the nature of the vulnerability, detect associated systems, detect associated software applications, and the like. These records may be provided an identifier or title, for example, one record may be titled "vulnerability assessment application," and "a process gap application." Additional or alternative applications may be executed as well. These are stored as vulnerability or issue records that may be scored and prioritized in an issue queue.

Continue with the current step S213, during the risk assessment step of the assessment phase, the central hub server 201 may score the issue record when, at a given individual process area or data source (e.g., vulnerability scanner), finds or identifies a shortcoming and puts into a vulnerability record generated by the vulnerability scanner application, a value indicating that the vulnerability scanner has identified a "very high-risk" or a "critical risk" vulnerability. Because the vulnerability scanner software modules have no context of what is or is not critical with respect to the enterprise, the risk may not be "very high" to the enterprise. That is, the data source, such as the vulnerability scanner, may be manufactured or configured to find a variance based on its configured logic, but not logic that is necessarily tailored to the needs of the enterprise. Thus, the amount of variance, and the resulting behaviors, may be normalized and tailored across data sources by the central hub server 201, better suiting the needs of monitoring the enterprise's policies and status quo. Here in the current step S213, the central hub server 201 executes one or more scoring algorithms for a given vulnerability based on the particular process area or appliance that generated the vulnerability record. For example, the tool of particular data source may indicate that a shortcoming is a "very high" or "critical vulnerability," which would ordinarily trigger an immediate response; but the central hub server 201 may normalize the new vulnerability record using preconfigured scoring normalization algorithms, and determine that, taken into consideration all of the other factors, the central hub server 201 might rate the vulnerability described in the newly-generated issue record a different way and call it a "medium" level vulnerability to be address within 30 days.

In a next step S215, in an issue management step of an issue treatment phase, the issue record of the vulnerability is then rated based upon the priority score received in the risk assessment phase, such as "low," "medium," or "high" rated issues, or some numerical value. This priority score may determine which remediation systems of the enterprise system may receive the issue record and which remediation systems and enterprise teams are tasked with addressing the vulnerability identified in the issue record. For example, for a "medium" issue, the central hub server 201 may indicate that the issue record must be addressed and updated to a "closed" status within 30 days, and then transmits the issue record to a ticket-based system of an IT helpdesk server (IT ticket system 211).

In a next step S217, in a mitigation decision step of an issue treatment phase, the hub server 201 may identify one or more computing devices (e.g., servers, workstations, laptops, appliances) of the enterprise system configured to mitigate vulnerabilities in an issue record. In operation, these mitigation servers execute various automated processes in response to receiving an issue record from the hub server 201. In some implementations, an action plan is automatically formulated and executed by the appropriate mitigation server. For example, the hub server 201 may transmit an issue record to a patch management server (e.g., IBM BigFix®, Microsoft SMS®) when an unpatched device is identified in the system. The patch management server may attempt to automatically transmit the missing software patch to the problematic device over the network of the system. In some implementations, the hub server 201 may determine that an issue record for a missing antivirus definition should be transmitted to a help desk user. As part of the action plan in the current step S217, some or all of the issue record may be used to populate a new help desk ticket in an IT ticket database 211.

The hub server 201 may identify a mitigation server based upon any number of factors mapped to the data fields of an issue record. For example, an issue record may indicate a type of vulnerability is an unnecessarily open port at a firewall or an unpatched operating system of a workstation. The hub server 201 may receive data records for each of these vulnerabilities from a network-vulnerability scanner appliance, and may then generate a vulnerability record for these respective vulnerabilities. The vulnerability records and issue records may comprise data fields that indicate, for example, an identifier (e.g., IP address, MAC address) of the device that generated and sent the data records, an identifier of the problematic devices on which the vulnerability was detected, a priority score, and an indicator for the type of vulnerability. In this example, the hub server 201 may determine that the appropriate mitigation server for the unpatched operating system vulnerability is based upon the priority score matching an authorization level or authority level to make determination on whether to accept the risk of keeping the device unpatched. Accordingly, the mitigation server would be an administrative computer or other end user device 209 executing a software application that may patch the computer, or may instruct the hub server 201 to accept the risk. If the operating system is patched by an automated patch management server, patched by a user having appropriate authorization, or if the authorized user submits a request to the hub server 201 to accept the risk, the hub server 201 terminates the issue record, and updates one or more configuration records associated with the vulnerability and the problematic device in a hub database 207b.

As mentioned previously, in some embodiments, like the exemplary embodiment shown in FIG. 2, the mitigation server may be an IT ticket server 211, which contains a distinct conventional IT ticket model. The hub server 201 may determine that the particular issue record indicates that the appropriate mitigation according to high priority score associated with a single device, such as out-of-date antivirus and unpatched operating system, suggesting that there is a problem with the specific device's connection with the system components that ordinarily push software updates to the device, and thus requires an onsite help desk technician to remedy the issue. The hub server 201 may automatically receive instructions to terminate the issue record when the issue is resolved, when the remediation server sends an instruction indicating the issue was addressed in a next step S219, or when the detecting device determines that the problematic device is no longer deficient.

In a next step S219, in a closure-monitoring step of the treatment phase, the central hub server 201 may continue to monitor the progress of the issue record having an assigned status to, for example, an IT ticket system 211 to function as the mitigation server. The hub server 201 or issue record may store identifiers configured to correlate the information of an IT ticket system 211 with the issue record, which may provide additional context to use for decisions, such identifying which enterprise systems and teams should be accountable the remediation of the issue record.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

What is claimed is:

1. A computer-implemented method comprising:
   receiving, by a computer, a set of data records, wherein each data record comprises a priority value for an electronic device, and wherein the priority value is indicative of a security risk to the electronic device based on a configured logic of the electronic device;
   generating, by the computer, a set of issue data records by applying a protocol to each data record, wherein each issue data record comprises an updated priority value for each data record indicative of a security risk to the computer;
   transmitting, by the computer to one or more mitigation servers, a subset of the set of issue data records in accordance with the updated priority value;
   monitoring, by the computer, the one or more mitigation servers to determine whether the one or more mitigation servers mitigate the security risk to the computer by updating a software configuration on the electronic device; and
   when at least one mitigation server updates the software configuration on the electronic device in accordance with the updated priority value of at least one issue data record, updating, by the computer, a status field of that issue data record to a status indicating a satisfied issue data record.

2. The computer-implemented method according to claim 1, wherein the updated priority value is indicative of the security risk to the computer determined based on polices of the computer.

3. The computer-implemented method according to claim 1, wherein each data record comprising a variance value for the electronic device.

4. The computer-implemented method according to claim 3, wherein the variance value 1s determined in accordance with a pre-determined enterprise software standard.

5. The computer-implemented method according to claim 1, wherein generating the set of issue data records comprises:
   identifying, by the computer, in a vulnerability database, a set of one or more vulnerability records each having at least a portion of one or more data fields corresponding to the priority value of the respective data record.

6. The computer-implemented method according to claim 5, wherein at least two of the vulnerability records are generated using data records received from at least two disparate devices of the electronic device.

7. The computer-implemented method according to claim 1, wherein a device of the electronic device is selected from the group consisting of: a network appliance, a security appliance, and an end user device.

8. The computer-implemented method according to claim 1, wherein each issue record comprises a unique identifier associated with the electronic device.

9. The computer-implemented method according to claim 8, wherein the unique identifier comprises at least one of an IP address and a MAC address of the electronic device.

10. A system comprising:
a computer configured to:
receive a set of data records, wherein each data record comprises a priority value for an electronic device, and wherein the priority value is indicative of a security risk to the electronic device based on a configured logic of the electronic device;
generate a set of issue data records by applying a protocol to each data record, wherein each issue data record comprises an updated priority value for each data record indicative of a security risk to the computer;
transmit to one or more mitigation servers, a subset of the set of issue data records in accordance with the updated priority value;
monitor the one or more mitigation servers to determine whether the one or more mitigation servers mitigate the security risk to the computer by updating a software configuration on the electronic device; and
when at least one mitigation server updates the software configuration on the electronic device in accordance with the updated priority value of at least one issue data record, update a status field of that issue data record to a status indicating a satisfied issue data record.

11. The system according to claim 10, wherein the updated priority value is indicative of the security risk to the computer determined based on polices of the computer.

12. The system according to claim 10, wherein each data record comprising a variance value for the electronic device.

13. The system according to claim 12, wherein the variance value is determined in accordance with a pre-determined enterprise software standard.

14. The system according to claim 10, wherein the computer is further configured to identify in a vulnerability database, a set of one or more vulnerability records each having at least a portion of one or more data fields corresponding to the priority value of the respective data record.

15. The system according to claim 14, wherein at least two of the vulnerability records are generated using data records received from at least two disparate devices of the electronic device.

16. The system according to claim 10, wherein a device of the electronic device is selected from the group consisting of: a network appliance, a security appliance, and an end user device.

17. The system according to claim 10, wherein each issue record comprises a unique identifier associated with the electronic device.

18. The system according to claim 17, wherein the unique identifier comprises at least one of an IP address and a MAC address of the electronic device.

* * * * *